(12) United States Patent
Rueschhoff et al.

(10) Patent No.: US 12,516,198 B2
(45) Date of Patent: Jan. 6, 2026

(54) ONE-COMPONENT SPRAY FOAM COMPOSITIONS AND DISPENSERS THEREOF

(71) Applicant: DAP Global Inc., Baltimore, MD (US)

(72) Inventors: Kenneth Rueschhoff, Ballwin, MO (US); Nicholas Yeates, Affton, MO (US); James Kenney, Baltimore, MD (US); Jay Zhang, Ballwin, MO (US); Kevin Corcoran, Fenton, MO (US)

(73) Assignee: DAP GLOBAL INC., Baltimore, MD (US)

( * ) Notice: Subject to any disclaimer, the term of this patent is extended or adjusted under 35 U.S.C. 154(b) by 240 days.

(21) Appl. No.: 18/219,827

(22) Filed: Jul. 10, 2023

(65) Prior Publication Data

US 2024/0026165 A1 Jan. 25, 2024

Related U.S. Application Data

(60) Provisional application No. 63/391,144, filed on Jul. 21, 2022.

(51) Int. Cl.
| | |
|---|---|
| *C09D 5/02* | (2006.01) |
| *B65D 83/18* | (2006.01) |
| *B65D 83/303* | (2025.01) |
| *C09D 5/18* | (2006.01) |
| *C09D 7/20* | (2018.01) |

(Continued)

(52) U.S. Cl.
CPC ............ *C09D 5/021* (2013.01); *B65D 83/18* (2025.01); *B65D 83/303* (2013.01); *C09D 5/18* (2013.01); *C09D 7/20* (2018.01); *C09D 7/45* (2018.01); *C09D 7/63* (2018.01); *C09D 7/65* (2018.01); *C09D 175/06* (2013.01); *C09D 175/08* (2013.01); *C09J 5/08* (2013.01); *C09J 11/06* (2013.01); *C09J 11/08* (2013.01); *C09J 175/06* (2013.01); *C09J 175/08* (2013.01)

(58) Field of Classification Search
CPC ............ C09D 5/021; C09D 5/18; C09D 7/20; C09D 7/45; C09D 7/63; C09D 7/65; C09D 175/06; C09D 175/08; C09J 5/08; C09J 11/06; C09J 11/08; C09J 175/06; C09J 175/08; C08J 9/146; C08J 2203/12; C08J 2203/14; C08J 2203/162

See application file for complete search history.

(56) References Cited

U.S. PATENT DOCUMENTS

| | | |
|---|---|---|
| 4,137,048 A | 1/1979 | Steinman |
| 5,307,964 A | 5/1994 | Toth |

(Continued)

FOREIGN PATENT DOCUMENTS

| | | |
|---|---|---|
| WO | 9421384 A1 | 9/1994 |
| WO | 2012044491 A1 | 4/2012 |

*Primary Examiner* — Vishal Pancholi
(74) *Attorney, Agent, or Firm* — Armstrong Teasdale LLP

(57) ABSTRACT

Described herein are one-component spray foam compositions having a low post post-expansion rate. Also described herein are methods of making and using one-component spray foam compositions having a low post-expansion rate. Also described herein are dispensers for dispensing the one-component spray foam compositions having a low post-expansion rate. Compositions and methods in accordance with the present disclosure are useful in a wide variety of applications, and are particularly useful in construction applications.

20 Claims, 14 Drawing Sheets

(51) Int. Cl.

| | |
|---|---|
| *C09D 7/45* | (2018.01) |
| *C09D 7/63* | (2018.01) |
| *C09D 7/65* | (2018.01) |
| *C09D 175/06* | (2006.01) |
| *C09D 175/08* | (2006.01) |
| *C09J 5/08* | (2006.01) |
| *C09J 11/06* | (2006.01) |
| *C09J 11/08* | (2006.01) |
| *C09J 175/06* | (2006.01) |
| *C09J 175/08* | (2006.01) |

(56) References Cited

U.S. PATENT DOCUMENTS

| | | | |
|---|---|---|---|
| 6,414,045 B1 * | 7/2002 | Heimpel | C08G 18/4018 |
| | | | 521/138 |
| 8,324,340 B2 * | 12/2012 | Burckhardt | C09K 3/1021 |
| | | | 548/546 |
| 8,701,945 B2 | 4/2014 | Hoagland et al. | |
| 8,998,041 B2 | 4/2015 | Strand | |
| 9,610,604 B2 | 4/2017 | Galvin et al. | |
| 9,828,764 B2 | 11/2017 | Parsons et al. | |
| 10,464,736 B1 | 11/2019 | Pindor et al. | |
| 10,519,353 B2 | 12/2019 | Crain et al. | |
| 10,611,554 B2 | 4/2020 | Schroer et al. | |
| 10,815,353 B1 * | 10/2020 | Slutskii | C08G 18/7671 |
| 10,913,816 B2 | 2/2021 | Selle et al. | |
| 2004/0157945 A1 * | 8/2004 | Barber | C08G 18/6637 |
| | | | 521/155 |
| 2018/0079881 A1 * | 3/2018 | Zhang | C08G 18/163 |
| 2019/0256277 A1 * | 8/2019 | Lechner | C08G 18/4804 |
| 2022/0033564 A1 | 2/2022 | Schoener et al. | |

\* cited by examiner

ONE-COMPONENT SPRAY FOAM COMPOSITIONS AND DISPENSERS THEREOF

CROSS-REFERENCE TO RELATED APPLICATIONS

This application claims priority to U.S. Provisional Application Ser. No. 63/391,144, filed on Jul. 21, 2022, the content of which is hereby incorporated by reference in its entirety.

FIELD OF DISCLOSURE

The present disclosure is directed to one-component spray foam compositions having a low post-expansion rate. This disclosure is also directed to methods of making and using one-component spray foam compositions having a low post-expansion rate. This disclosure is also directed to dispensers for dispensing the one-component spray foam compositions having a low post-expansion rate. Compositions and methods in accordance with the present disclosure are useful in a wide variety of applications, and are particularly useful in construction applications.

BACKGROUND

One-component foam compositions, also known as 1K formulations or OCF, are widely used in a variety of applications, including construction applications. Among the most widespread one-component foam formulations are one-component polyurethane foam formulations. Conventional one-component polyurethane foam formulations typically include polyols (polyester/or polyether polyol with functionality of about 2 to 3), a catalyst (typically DMDEE (dimorpholine diethyl ether)), a foam stabilizer/surfactant, a flame retardant (typically TCPP (Tris (chloroisopropyl) phosphate) or TDCPP (Tris(1,3-dichloro-2-propyl) phosphate)) and/or Chlorinated Paraffins, polymeric MDI, and a propellant/blowing agent. In aerosol can formulations (in sizes of 30.5 oz or less), flammable propellants are typically used (e.g. a blend of propane, n-butane, i-butane and dimethyl ether), although non-flammable propellants may also be used. These non-flammable propellants can be one or more of HFC-134a (1,1,1,2-Tetrafluoroethane), HFC-245fa (1,1,1,3,3-Pentafluoropropane), HFO-1234ze (1,3,3,3-Tetrafluoropropene), HFO-1233zd (1-Chloro-3,3,3-trifluoropropene), HFO-1336mzz-Z (Cis-1,1,1,4,4,4-Hexafluoro-2-butene), HFO-1336mzz-E (Trans-1,1,1,4,4,4-Hex afluoro-2-butene), etc.

However, conventional one-component polyurethane foams expand a significant amount after initial dispensing. This expansion is also referred as post expansion and may last for hours until the foam is fully cured. It presents difficulties in judging an initial dispensing amount required to produce a desired final amount (e.g. the foam bead size). Further, the resulting applied foams often exhibit poor performance when under-applied and poor appearance, thereby requiring labor-intensive trimming, when over-applied. Moreover, conventional dispensers compromise cost for effectiveness and vice versa. Some conventional dispensers are inexpensive and disposable straws that have messy dripping issues after dispensing, lack dispensing control, and have limited long-term storage between uses. Other conventional dispensers are expensive and bulky applicator guns. Still other conventional dispensers are medium cost applicators that have issues with dispensing control, such as simultaneously actuating a valve and dispensing. Finally, aerosol valves for viscous polyurethane foams have notoriously poor fine flow control and a surging issue, often at the initial dispense, that overdispenses foam and causes a mess.

The present disclosure provides one-component foam compositions having a low post-expansion rate, as well as dispensers for dispensing the one-component polyurethane spray foam compositions having a low post-expansion rate. The one-component foam compositions dispensed with the dispenser may be applied with fine flow control and are capable of achieving premium performance characteristics.

BRIEF DESCRIPTION OF THE DISCLOSURE

In one aspect, provided herein is a one-component polyurethane spray foam composition comprising: an isocyanate-containing compound selected from the group consisting of 4,4'-diphenylmethane diisocyanate, polymeric 4,4'-diphenylmethane diisocyanate, prepolymers based on 4,4'-diphenylmethane diisocyanate, and combinations thereof; optionally a polyol; a propellant; optionally a flame retardant; optionally a plasticizer; optionally a surfactant; and optionally a catalyst.

In another aspect, provided herein is a method of making a one-component polyurethane spray foam composition comprising: an isocyanate-containing compound selected from the group consisting of 4,4'-diphenylmethane diisocyanate, polymeric 4,4'-diphenylmethane diisocyanate, prepolymers based on 4,4'-diphenylmethane diisocyanate, and combinations thereof; optionally a polyol; a propellant; optionally a flame retardant; optionally a plasticizer; optionally a surfactant; and optionally a catalyst, the method comprising forming a mixture comprising the isocyanate-containing compound; optionally the polyol; the propellant, optionally the flame retardant; optionally the surfactant; and optionally the catalyst.

In yet another aspect, provided herein is a method of applying a one-component polyurethane spray foam composition comprising: an isocyanate-containing compound selected from the group consisting of 4,4'-diphenylmethane diisocyanate, polymeric 4,4'-diphenylmethane diisocyanate, prepolymers based on 4,4'-diphenylmethane diisocyanate, and combinations thereof; optionally a polyol; a propellant; optionally a flame retardant; optionally a plasticizer; optionally a surfactant; and optionally a catalyst, the method comprising applying the one-component polyurethane spray foam composition to an application site.

In still another aspect, provided herein is a dispenser comprising: a pressurized container comprising: a reservoir comprising a one-component spray foam composition; and a valve assembly; and a mechanical applicator comprising: a body comprising: a valve connection fluidically connected to the valve assembly of the pressurized container; an internal foam path fluidically connected to the valve connection; and an actuator configured to actuate the valve assembly of the pressurized container between a storage configuration and an open configuration, wherein the valve assembly of the pressurized container is held in the open position when actuated to the open configuration; and an outlet nozzle fluidically connected to the internal foam path.

DETAILED DESCRIPTION OF THE DISCLOSURE

Figure 1:
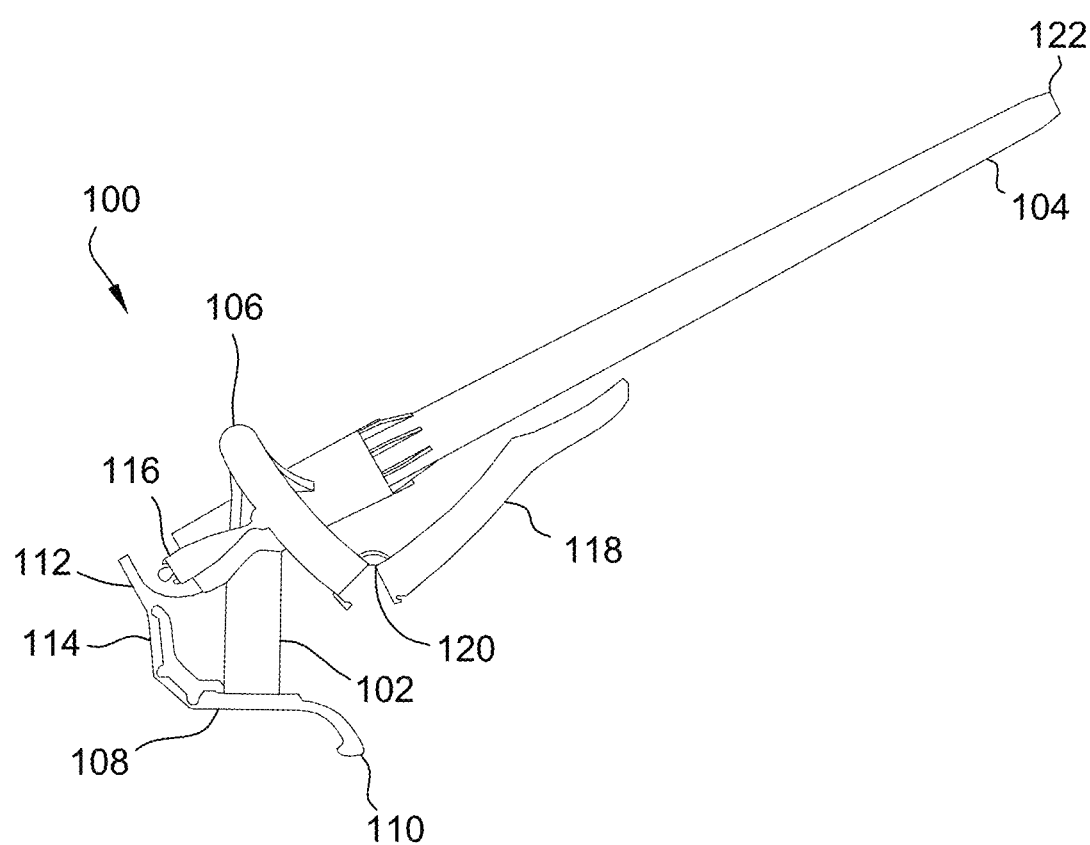
FIG. 1 is an exemplary embodiment of a side view of a nozzle assembly configured to be used with an aerosol can in accordance with the present disclosure.

One-component foam compositions in accordance with the present disclosure have low post-expansion rates. They may be applied with fine flow control and are capable of achieving premium performance characteristics. The combination of low post-expansion rates and precise application provides minimal disparities between dispensed compositions and fully cured compositions.

As used herein, the post-expansion rate is defined as the increase in percent from initially applied to fully cured bead size by volume measured and calculated per ASTM C 1643. The post-expansion rate is a type of post-expansion rate that describes the expansion of foam after expansion out of a dispensing apparatus (e.g. an aerosol can). The post-expansion rate depends on frothing and expansion after primary frothing. For sealing common gaps and cracks, a minimal post-expansion rate is desirable in preventing excessive expansion that either requires labor intensive trim or poor quality foam appearance.

Composition

In many embodiments, a one-component polyurethane spray foam composition according to the present disclosure comprises: an isocyanate-containing compound selected from the group consisting of 4,4'-diphenylmethane diisocyanate, polymeric 4,4'-diphenylmethane diisocyanate, prepolymers based on 4,4'-diphenylmethane diisocyanate, and combinations thereof; optionally a polyol; a propellant; optionally a flame retardant; optionally a plasticizer; optionally a surfactant; and optionally a catalyst.

In some embodiments, the one-component polyurethane spray foam composition has a post-expansion rate of less than about 50%, less than about 45%, less than about 40%, less than about 35%, less than about 30%, less than about 25%, less than about 20%, less than about 15%, less than about 10%, or less than about 5%.

Generally, the one-component polyurethane spray foam composition according to the present disclosure is contained in an uncured form and then cures after application. In some embodiments, a cured composition is producible from the one-component polyurethane spray foam composition. In some embodiments, the one-component polyurethane spray foam composition is configured to cure. In some embodiments, the one-component polyurethane spray foam composition is configured to cure after spraying.

In some embodiments, the cured one-component polyurethane spray foam composition is a product. In some embodiments, the product is selected from the group consisting of adhesives, sealants, insulating materials, building materials, and combinations thereof.

In some embodiments, the prepolymer is a reaction product of a polyol and an isocyanate. In other words, the isocyanate and polyol react to become a reaction product known in the art as a polyurethane prepolymer. In some embodiments, the prepolymer is a reaction product of a polyol and 4,4'-diphenylmethane diisocyanate.

In some embodiments, the isocyanate-containing compound whitens the polyurethane spray foam composition and/or the resulting cured compositions. In these embodiments, the isocyanate-containing compound is selected from the group consisting of 4,4'-diphenylmethane diisocyanate, prepolymers based on 4,4'-diphenylmethane diisocyanate, and combinations thereof.

In some embodiments, the polyol of the prepolymer is selected from the group consisting of polyol diols, polyol triols, and combinations thereof.

In some embodiments, the one-component polyurethane spray foam composition comprises a further polyol selected from the group consisting of polyether polyols, polyester polyols, aromatic polyols, aliphatic polyols, and combinations thereof.

Generally, the polyol may possess any useful functionality known in the art. In some embodiments, the polyol comprises a functionality in a range of from about 1.5 to about 4, preferably about 1.7 to about 3.2, and more preferably about 2 to about 2.5. In some embodiments, the polyol comprises 2 to 3 functional OH groups.

Generally, the polyol may possess any useful molecular weight known in the art. In some embodiments, the polyol comprises an average molecular weight in a range of from about 45 to about 6000 g/mol, preferably 150 to about 2000 g/mol, more preferably about 300 to about 1500 g/mol, and even more preferably about 500 to about 1000 g/mol. In many embodiments, the molecular weight of the polyol is critical to achieve the desired ratio of NCO:OH in the polyurethane foam formulation.

Generally, the ratio of NCO:OH in the polyurethane foam is critical to the post-expansion of the polyurethane foam. In many embodiments, the ratio of NCO:OH in the polyurethane foam formula may be used to predetermine the amount of post-expansion. In some embodiments, the ratio of NCO:OH is in a range of from about 3.5 to about 5.5. In some embodiments, the ratio of NCO:OH is in a range of from about 3.7:1 to about 4.0:1. This ratio can affect many aspects of OCF products, such as the product shelf-life, in-can viscosity and dispensing rate, chemical reaction and curing speed, and post-expansion rate.

Generally, the relative amount of unreacted isocyanate in the polyurethane foam cans is critical to the post-expansion of the polyurethane foam. The ratio of NCO:OH in the polyurethane foam formula determines the amount of unreacted isocyanate in the polyurethane foam cans after being manufactured. The lower the NCO:OH ratio, the less the amount of unreacted NCO in the manufactured OCF cans. In some embodiments, the relative amount of unreacted isocyanate in the polyurethane foam after expansion and post-expansion is in a range of from about 8% to about 16% of the filled weight in the OCF cans. In some embodiments, the relative amount of unreacted isocyanate is in a range of from about 9% to about 14%. In some embodiments, the relative amount of unreacted isocyanate in the polyurethane foam after expansion and post-expansion is in a range of from about 10% to about 11%. In some embodiments, the relative amount of unreacted isocyanate in the polyurethane foam after expansion and post-expansion is about 10.5%.

In some embodiments, the isocyanate-containing compound is 4,4'-diphenylmethane diisocyanate. In some embodiments, 4'-diphenylmethane diisocyanate is the only isocyanate in the one-component polyurethane spray foam composition.

In some embodiments, the one-component polyurethane spray foam composition further comprises a compound containing one or more isocyanate functional groups selected from the group consisting of polymeric isocyanates, aromatic isocyanates, aliphatic isocyanates, and combinations thereof. In some embodiments, the one-component polyurethane spray foam composition does not comprise a compound containing one or more isocyanate functional groups selected from the group consisting of polymeric isocyanates, aromatic isocyanates, aliphatic isocyanates, and combinations thereof.

In some embodiments, the propellant comprises a flammable propellant selected from the group consisting of hydrocarbons, ether compounds, low molecular weight ether compounds, and combinations thereof. This type of propellant may be particularly useful for a small container size and/or small application job or in an area with adequate ventilation. In some embodiments, the propellant comprises a flammable propellant selected from the group consisting of propane, butane, isobutane, dimethyl methyl ether (DME), and combinations thereof. In some embodiments, the propellant comprises a mixture of propane, isobutane, and DME.

In some embodiments, the propellant comprises a non-flammable propellant selected from the group consisting of hydrofluoroolefins (HFO), hydrofluorocarbons (HFC), chlorocarbons, and combinations thereof. This type of propellant contributes to the non-flammability and global warming potential (GWP) status of the formulations. In some embodiments, the propellant comprises a hydrofluoroolefin selected from the group consisting of HFO 1234ze, HFO 1233zd, and combinations thereof. In some embodiments, the propellant comprises only non-flammable propellants.

In many embodiments, the one-component polyurethane spray foam composition may include suitable additional flame retardants known in the art. In some embodiments, the flame retardant is selected from the group consisting of halogenated organophosphates, organophosphates, chlorinated paraffins, brominated compounds, expandable graphite, and combinations thereof. In some embodiments, the flame retardant comprises tri-chloroethyl-phosphate (TCPP) and/or chlorinated paraffin.

In some embodiments, the one-component polyurethane spray foam composition does not comprise chlorinated paraffin. In some embodiments, the one-component polyurethane spray foam composition comprises TCPP in an amount in a range of from about 15 wt % to about 100 wt %.

In many embodiments, the one-component polyurethane spray foam composition may include any suitable plasticizer known in the art. In some embodiments, the one-component polyurethane spray foam composition comprises a plasticizer selected from the group consisting of tri-chloroethyl-phosphate (TCPP), 2,2,4-trimethyl-1,3-pentanediol diisobutyrate (TXIB), bis(2-ethylhexyl) phthalate (DOP), soybean oil, tris (2,3-dichloropropyl) phosphate (TDCP), chlorinated paraffin, and combinations thereof.

In many embodiments, the one-component polyurethane spray foam composition may include any suitable foam stabilizer or surfactant known in the art. In some embodiments, the foam stabilizer or surfactant comprises a silicone containing compound or a non-silicone containing compound. In some embodiments, the foam stabilizer or surfactant comprises a silicone containing compound.

In many embodiments, the one-component polyurethane spray foam composition may include any suitable catalyst known in the art. In some embodiments, the one-component polyurethane spray foam composition comprises an amine catalyst. In some embodiments, the one-component polyurethane spray foam composition comprises a catalyst selected from the group consisting of 2,2'-dimorpholinodiethylether (DMDEE), a low color version of DMDEE (DMDLC), a stabilized version of DMDEE (DMDLS), and combinations thereof.

Methods of Preparation

In many embodiments, the one-component polyurethane spray foam composition may be prepared according to any suitable method known in the art.

In some embodiments, the one-component polyurethane spray foam composition is prepared by forming a mixture comprising the components of the one-component polyurethane spray foam composition.

In some embodiments, the polyols, surfactant, catalyst, and optional other ingredients are mixed together in a mixing vessel to form a pre-blend. This pre-blend is further mixed with isocyanates and propellant or other additives, such as color, in a pressure rated container to allow reaction and form a mixture containing polyurethane prepolymer. The method or sequence can vary depending on equipment that is used. The filled container can be packaged with labels, spray nozzle and other accessories before being provided to applicator or sprayers. Other accessories may include accessories that aid in dispensing or product safety for the end user, such as a cap and/or gloves.

Methods of Use

In many embodiments, the one-component polyurethane spray foam composition may be used according to any suitable method known in the art. In some embodiments, the one-component polyurethane spray foam composition may be used by applying the one-component polyurethane spray foam composition.

In some embodiments, a method of applying the one-component polyurethane spray foam composition comprises applying the one-component polyurethane spray foam composition to an application site.

In some embodiments, the applying the one-component polyurethane spray foam composition comprises dispensing the one-component polyurethane spray foam composition from a reservoir of a pressurized container.

In some embodiments, the application site comprises a surface optionally comprising a cavity and/or a hole. As used herein, "a surface optionally comprising a cavity and/or a hole" generally refers to an application site that may include small holes, cavities, gaps, cracks, and/or indentations as part of the application site.

In some embodiments, the application site is selected from the group consisting of a wall, a floor, a ceiling, a door, a window, a construction material, a rim joist, a band joist, an HVAC duct, an HVAC sealing, an application site in a basement, an application site in an attic, a hard-to-reach area, an insulation surface, cavities thereof, holes thereof, gaps thereof, cracks thereof, and combinations thereof.

Dispenser

Generally, the one-component spray foam composition may be dispensed with any suitable dispenser known in the art. In some embodiments, the dispenser is selected from the group consisting of a straw-type applicator, a one-piece applicator with straw attached, a gun applicator, a smart dispenser, an integrated cap applicator, a broadcast foam dispenser, and a ball valve-type dispenser.

In some embodiments, the dispenser comprises: a pressurized container comprising: a reservoir comprising a one-component spray foam composition; and a valve assembly; and a mechanical applicator comprising: a body comprising: a valve connection fluidically connected to the valve assembly of the pressurized container; an internal foam path fluidically connected to the valve connection; and an actuator configured to actuate the valve assembly of the pressurized container between a storage configuration and an open configuration, wherein the valve assembly of the pressurized container is held in the open position when actuated to the open configuration; and an outlet nozzle fluidically connected to the internal foam path.

Generally, the one-component spray foam composition may be any suitable one-component spray foam composition known in the art. In some embodiments, the one-component spray foam composition is a one-component polyurethane spray foam composition. In some embodiments, the one-component spray foam composition is a one-component latex spray foam composition. In some embodiments, the one-component spray foam composition is a one-component polyurethane dispersion foam composition. In some embodiments, the one-component spray foam composition is a one-component Michael addition foam composition.

In many embodiments, the pressurized container and the mechanical applicator are separable. In some embodiments, the mechanical applicator is attached to a side of the pressurized container for transportation and/or storage.

In many embodiments, the mechanical applicator is configured to be mechanically coupled to the pressurized container. In some embodiments, the mechanical applicator is configured to be screwed or snapped onto the pressurized container.

Container

Generally, the one-component polyurethane spray foam composition may be stored, transported, and used in any suitable container known in the art. In many embodiments, the one-component polyurethane spray foam composition is contained in a pressurized container comprising a reservoir. In some embodiments, the pressurized container is an aerosol can.

In some embodiments, the pressurized container comprises a reservoir and a valve assembly. The valve assembly is adjustable between a closed configuration and an open configuration. When in the closed configuration, the valve is non-depressed, and polyurethane foam cannot flow out of the reservoir. When in the open configuration, the valve is depressed or tilted to actuate, and polyurethane foam can flow out of the reservoir.

The pressurized container may be any suitable size known in the art. In some embodiments, the pressurized container is a 10 oz, 12 oz, 16 oz, 18 oz, 22 oz, 24 oz, 28 oz, 30 oz, or 30.5 oz aerosol can.

Mechanical Applicator

In many embodiments, the dispenser comprises a mechanical applicator that is used to spray the one-component polyurethane spray foam composition. In some embodiments, the combination of the one-component polyurethane foam composition having a low post-expansion rate and the mechanical applicator enables spraying the one-component polyurethane spray foam composition with a low post-expansion rate.

In many embodiments, mechanical applicator comprises a body comprising: a valve connection fluidically connected to the valve assembly of the pressurized container; an internal foam path fluidically connected to the valve connection; and an actuator configured to actuate the valve assembly of the pressurized container between a storage configuration and an open configuration, wherein the valve assembly of the pressurized container is held in the open position when actuated to the open configuration; and an outlet nozzle fluidically connected to the internal foam path.

Generally, the mechanical applicator is in fluidic communication with the container to enable flow of polyurethane foam from the container, through an internal flow path of the mechanical applicator, and to the outlet nozzle. The mechanical applicator serves as a fluidic path from the outlet of the reservoir to the application site.

In some embodiments, the outlet nozzle comprises a tapered end portion. In some embodiments, the outlet nozzle comprises a control rod disposed therein.

In some embodiments, the control rod extends into the internal foam path. In some embodiments, the internal foam path comprises an aperture, wherein the control rod extends through the aperture and seals the internal foam path. In some embodiments, the internal foam path comprises an internal spring, a washer, and an O-ring disposed therein. In some embodiments, the internal spring is configured to force the control rod against the tapered portion of the outlet nozzle, thereby providing an interference fit of the control rod and fine flow control of the one-component polyurethane spray foam composition.

Generally, the actuator may be any suitable mechanical actuator known in the art. In some embodiments, the actuator is a mechanical actuator selected from the group consisting of a push pad, a button, a switch, a rotatable dial, a lift catch, a rotating cam, a lift-to-release mechanism, and combinations thereof. In some embodiments, the actuator comprises a mechanical coupler to couple the actuator to the pressurized container. In some embodiments, the actuator comprises a latch point to latch onto a surface of the pressurized container. In some embodiments, the latch point latches onto the surface of the pressurized container or to a portion of the valve attached to the pressurized container when in the open configuration. In some embodiments, the actuator is configured to release the aerosol can valve from an open position to a closed position for storage through a single end user action.

In some embodiments, the mechanical applicator further comprises a trigger actuator. In some embodiments, the trigger actuator is a foldable trigger actuator. When depressed, the trigger actuator moves a control rod in the internal flow path to an open position, thereby dispensing a foam.

Generally, the valve connection provides fluidic communication between an inner flow path of a nozzle assembly and a valve assembly of the pressurized container. In some embodiments, the valve connection engages with the valve assembly of the pressurized container. In some embodiments, the valve connection tilts or depresses a valve of the pressurized container.

In many embodiments, the body and the outlet nozzle are separable and joinable. Generally, the body and the outlet nozzle may be joined with any suitable joining configuration known in the art. In some embodiments, the body is joined to the outlet nozzle via a configuration selected from the group consisting of a ring snap fit and/or interference fit, a tongue and groove fit, threading, welding, adhesive, and combinations thereof.

In some embodiments, the body comprises a ring snap fit and/or interference fit with the outlet nozzle.

In some embodiments, the valve connection comprises a threading.

In some embodiments, the mechanical applicator is reusable. In some embodiments, the mechanical applicator is reusable for up to 90 days, typically 30-45 days, after the first-time use. The reusability of the mechanical applicator is a substantial improvement over conventional applicators, which often become clogged and unusable after one day or less.

Specific embodiments of the mechanical applicator are depicted in the figures and described in detail below. These embodiments are non-limiting.

A nozzle assembly 100 configured to be used with an aerosol can is shown in FIG. 1. The nozzle assembly 100 includes a body 102, an outlet nozzle 104, and a trigger actuator 106.

The body 102 includes a valve connection 108 that provides fluidic communication between an inner flow path of the nozzle assembly 100 (not shown) with a valve assembly of an aerosol canister (not shown). The nozzle assembly 100 includes a tilt actuation lock and release lever 110. The tilt actuation lock and release lever 110 allows for mechanical coupling with an aerosol canister (not shown). When the tilt actuation lock and release lever 110 is mechanically coupled to a cup of an aerosol can (not shown), it actuates an aerosol valve of the aerosol canister and holds it open. The body 102 includes a push pad including an "ON" portion 112 and a "STORE" portion 114. A user may push the "ON" portion 112 to configure the nozzle assembly 100 into an active position. A user may push the "STORE" portion 114 to configure the nozzle assembly 100 into an inactive position. Pushing the "STORE" portion 114 moves the lever 110 forward and away from the cup of an aerosol can (not shown), and then by releasing the "STORE" portion 114, the nozzle assembly 100 is allowed to rotate back to an inactive position. These operations are critical to release the aerosol can valve (not shown) back to a closed position for storage through a single end user action.

The trigger actuator 106 includes a trigger back strap 116 and a trigger assembly 118. The trigger back strap 116 snaps to a control rod in the internal flow path (not shown). When depressed, the trigger assembly 118 moves a control rod in the internal flow path (not shown) to an open position, thereby dispensing a foam. The trigger assembly 118 may be a foldable trigger including a living hinge 120.

The outlet nozzle 104 includes a tapered portion 122.

Figure 2A:
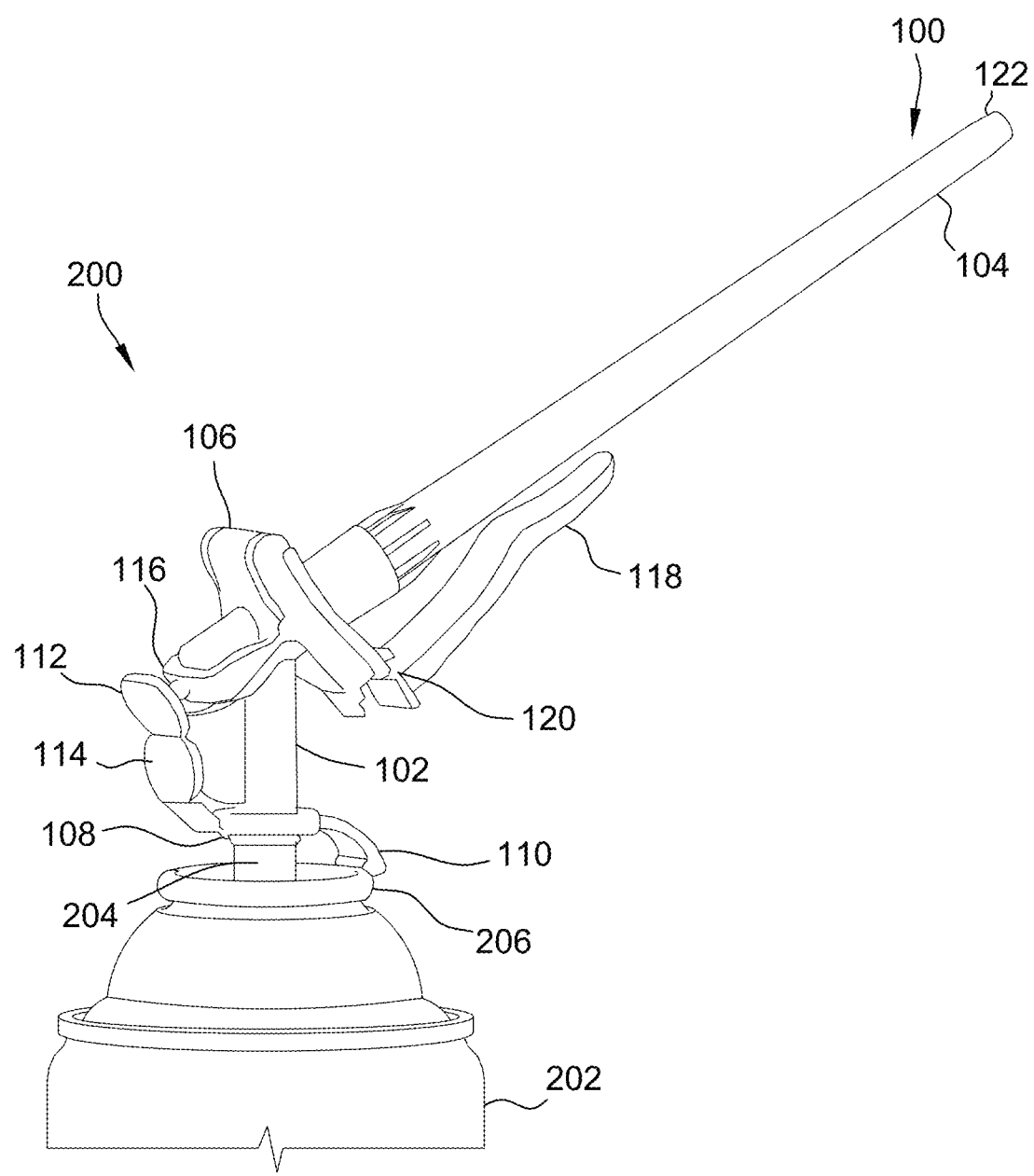
FIG. 2A is an exemplary embodiment of a perspective view of a nozzle assembly connected to an aerosol can in accordance with the present disclosure.

A first view of a first combination 200 of an aerosol can 202 and nozzle assembly 100 is shown in FIG. 2A. This perspective view depicts engagement between valve connection 108 and a valve assembly of the aerosol can 204. This perspective view also depicts engagement between the tilt actuation lock and release lever 110 and a cup of the aerosol can 206. The labels on the "ON" portion 112 and a "STORE" portion 114 are clearly visible.

Figure 2B:
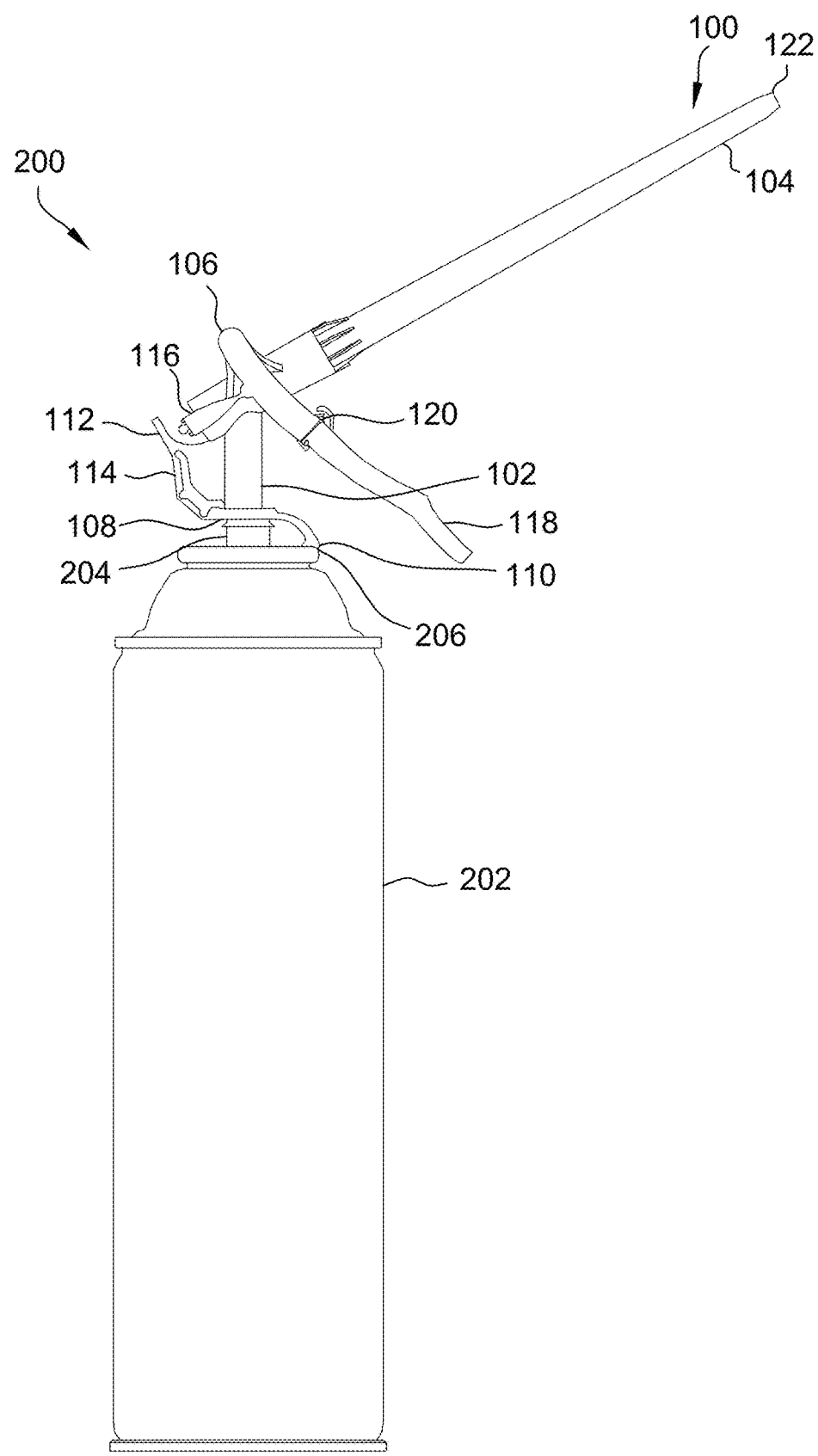
FIG. 2B is an exemplary embodiment of a side view of a nozzle assembly connected to an aerosol can in accordance with the present disclosure.

A second view of the first combination 200 of an aerosol can 202 and nozzle assembly 100 is shown in FIG. 2B. This side view depicts engagement between valve connection 108 and a valve assembly of the aerosol can 204. This side view also depicts engagement between the tilt actuation lock and release lever 110 and a cup of the aerosol can 206. The entire aerosol can 202 is depicted. The trigger assembly 118 is unfolded.

Figure 2C:
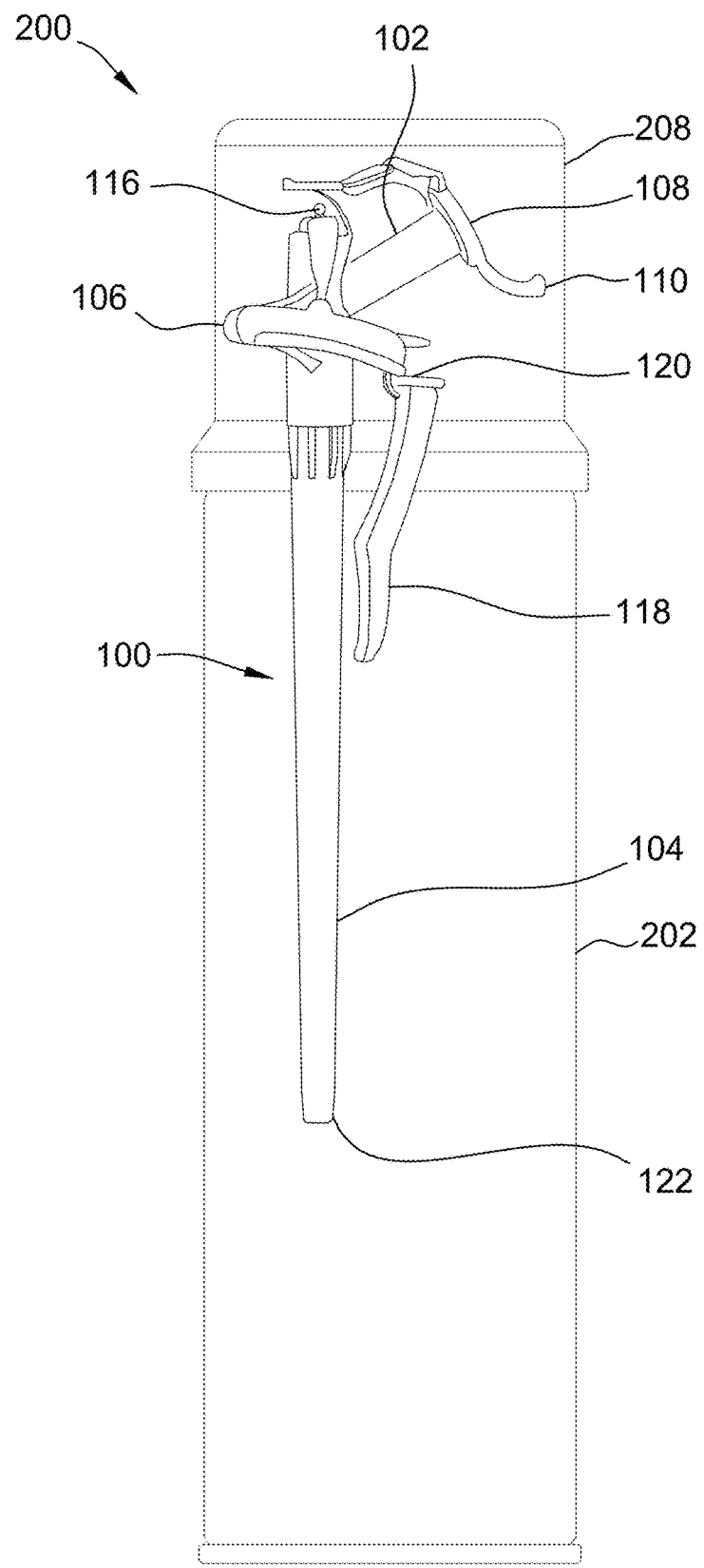
FIG. 2C is an exemplary embodiment of a perspective view of a nozzle assembly attached to the side of an aerosol can in accordance with the present disclosure.

A third view of the first combination 200 of an aerosol can 202 and nozzle assembly 100 is shown in FIG. 2C. This side view depicts the nozzle assembly 100 attached to the side of the aerosol can 200. This configuration is particularly suitable for transportation and/or storage. In this way, the nozzle assembly 100 is detachable from the aerosol can 202. The aerosol can 202 includes a cover 208 that goes over the top of the aerosol can 202.

Figure 2D:
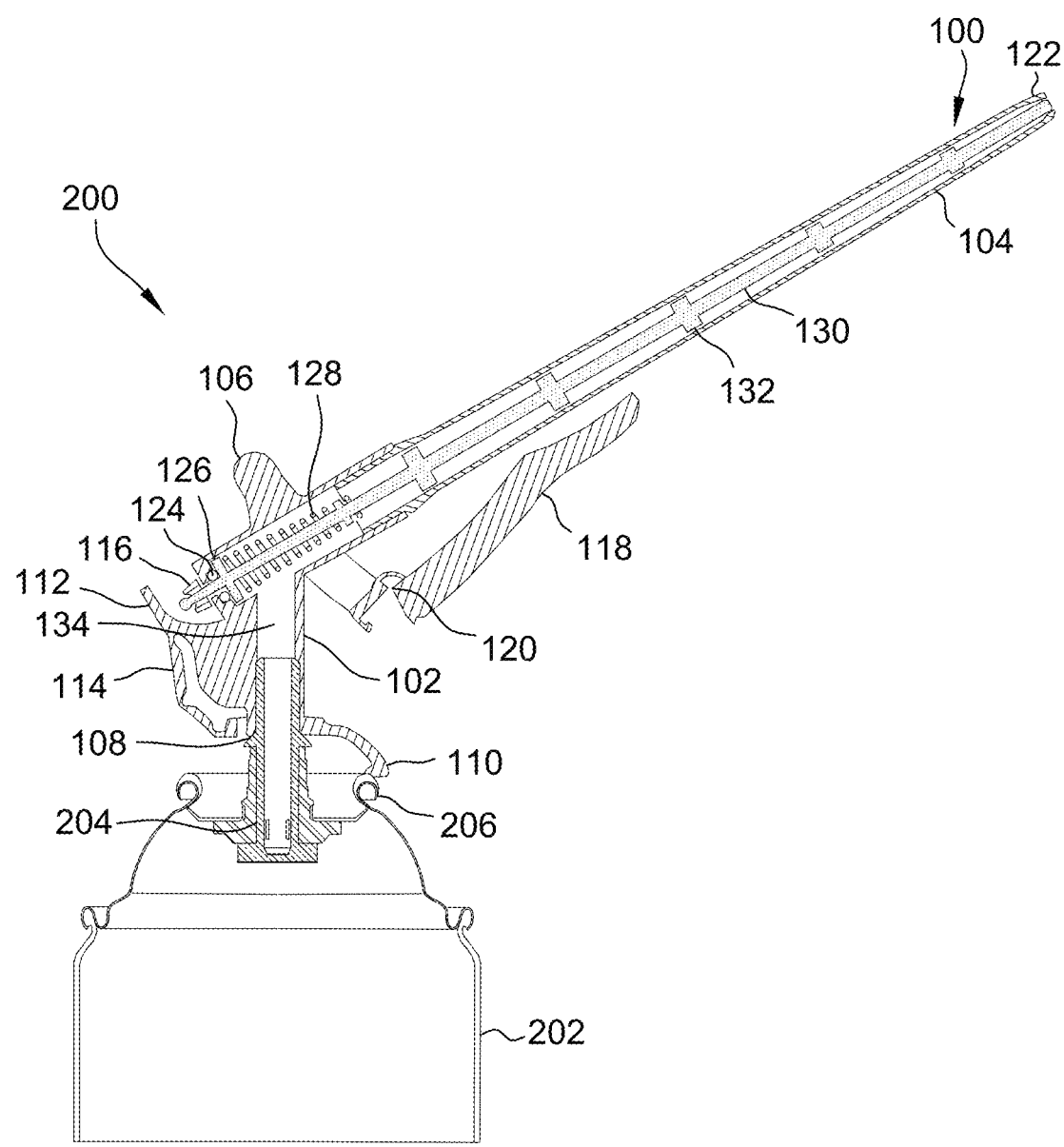
FIG. 2D is an exemplary embodiment of a transparent side view of a nozzle assembly connected to an aerosol can in accordance with the present disclosure.

A fourth view of the first combination 200 of an aerosol can 202 and nozzle assembly 100 is shown in FIG. 2D. This transparent view depicts the inner flow path 134 of the nozzle assembly 100. The valve connection 108 provides fluidic communication between inner flow path 134 and a valve assembly of the aerosol can 204. Disposed within the inner flow path 134 are an O-ring 124, washer 126, internal spring 128, and control rod 130. The O-ring 124 may be made of a flexible material, such as rubber, and seals to the control rod 130. The washer 126 may be a flat washer. The internal spring 128 forces the control rod 130 closed and holds the O-ring 124 in place. The control rod 130 controls the flow of foam within the nozzle assembly 100. Stabilizers 132 positioned along the control rod 130 keep the control rod 130 centered under compression and also keep the control rod 130 from buckling under compression due to the internal spring 128. A tapered portion 122 of the outlet nozzle 104 provides a tapered interference fit of the control rod 130 for sealing and fine flow control.

Figure 3A:
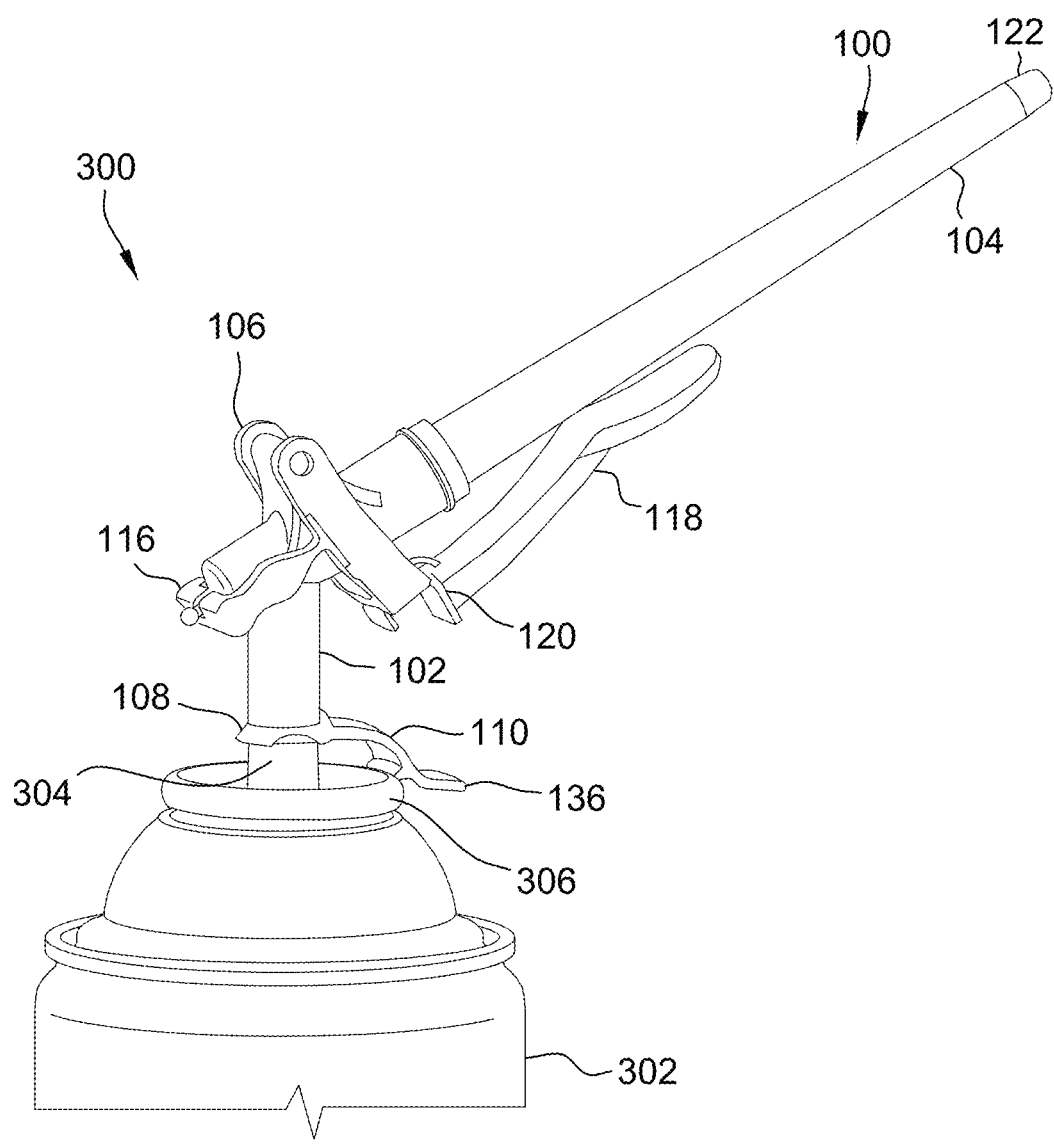
FIG. 3A is an exemplary embodiment of a side view of a nozzle assembly connected to an aerosol can in accordance with the present disclosure.

A first view of a second combination 300 of an aerosol can 302 and nozzle assembly 100 is shown in FIG. 3A. This perspective view depicts engagement between valve connection 108 and a valve assembly of the aerosol can 304. This perspective view also depicts engagement between the tilt actuation lock and release lever 110 and a cup of the aerosol can 306. The release lever 110 includes an elongated portion 136 that acts as a lift-to-release mechanism.

Figure 3B:
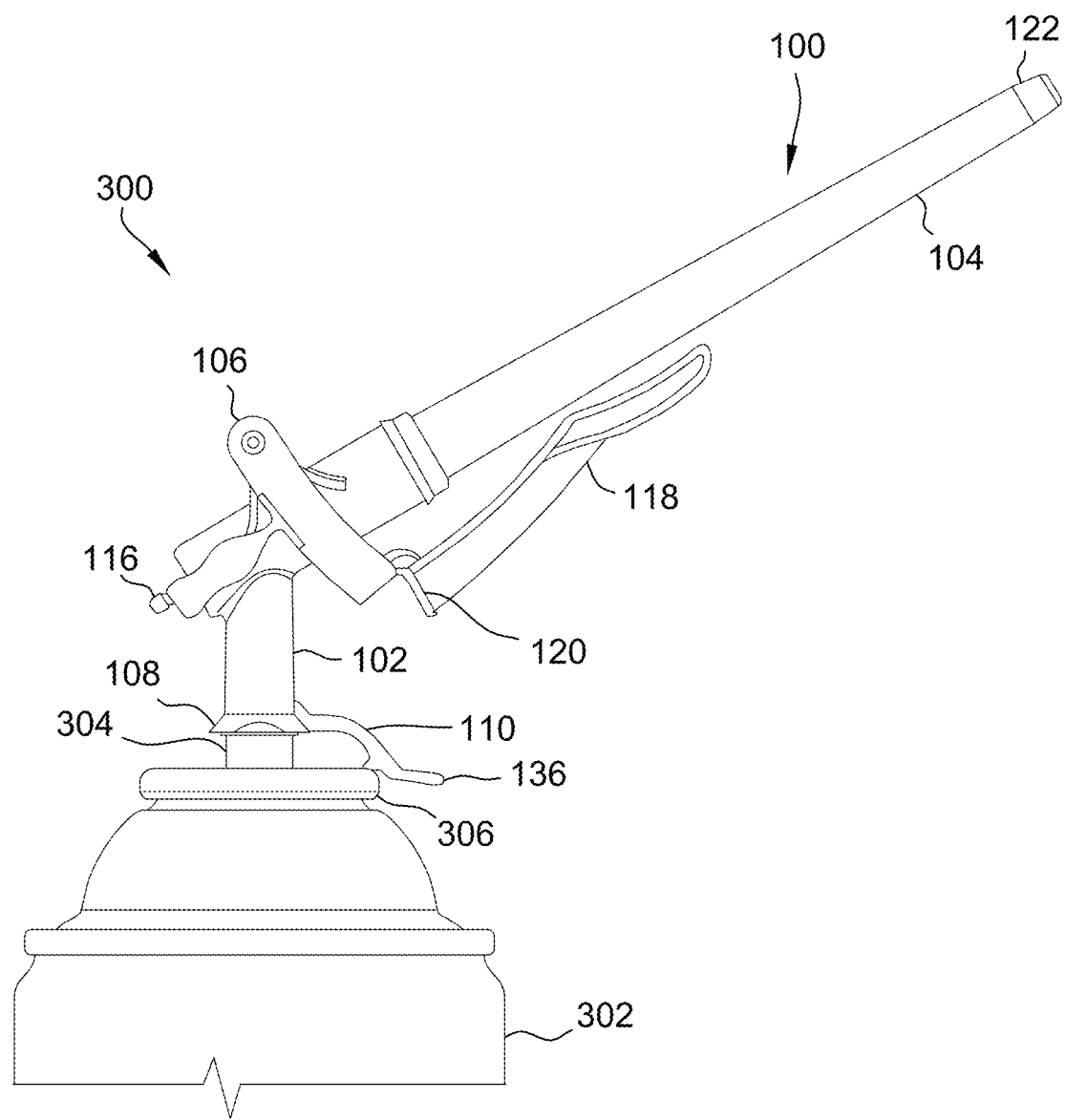
FIG. 3B is an exemplary embodiment of a side view of a nozzle assembly connected to an aerosol can in accordance with the present disclosure.

A second view of the second combination 300 of an aerosol can 302 and nozzle assembly 100 is shown in FIG. 3B. This side view depicts engagement between valve connection 108 and a valve assembly of the aerosol can 304. This side view also depicts engagement between the tilt actuation lock and release lever 110 and a cup of the aerosol can 306. The release lever 110 includes an elongated portion 136 that acts as a lift-to-release mechanism.

Figure 4A:
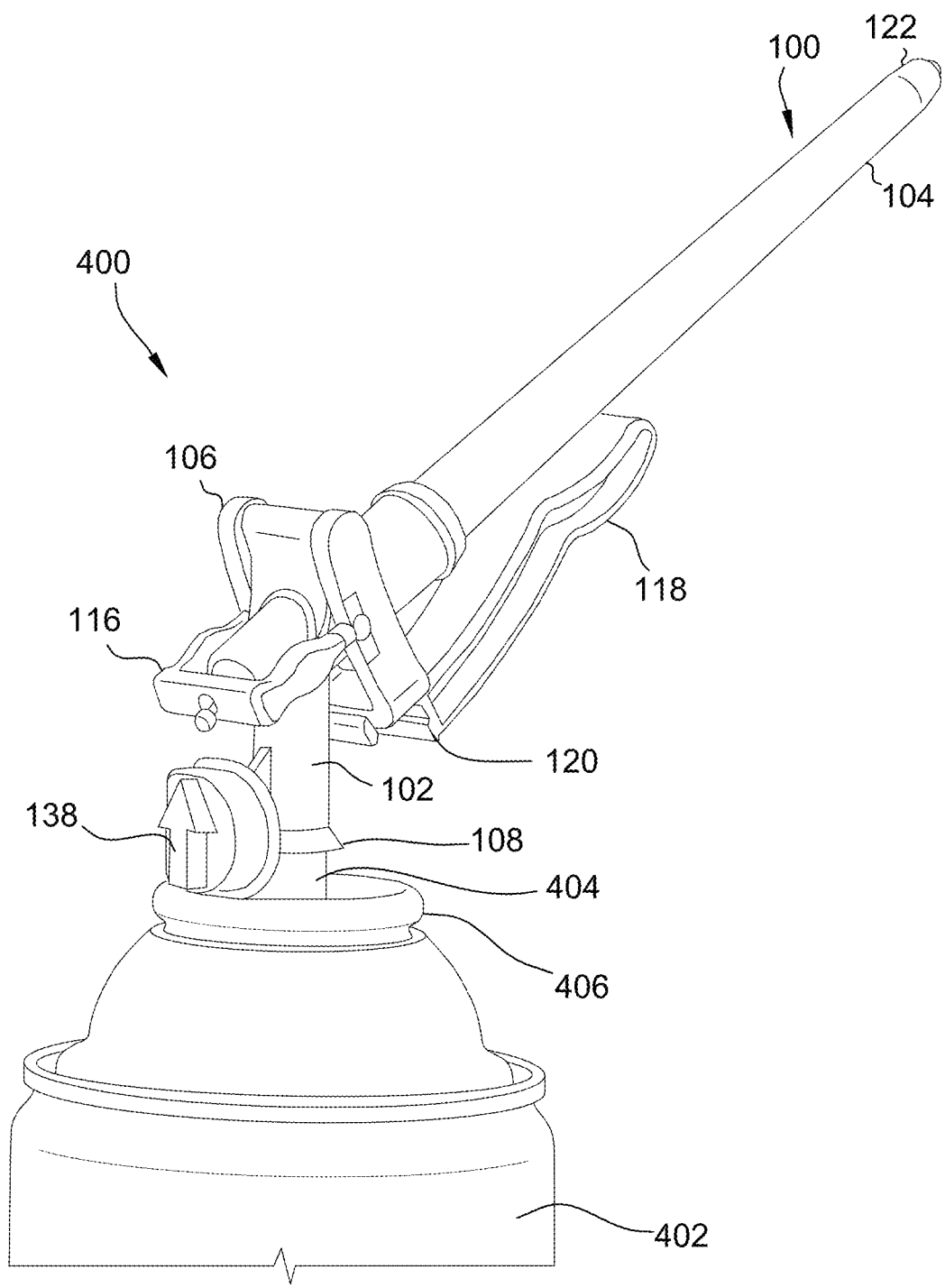
FIG. 4A is an exemplary embodiment of a side view of a nozzle assembly connected to an aerosol can in accordance with the present disclosure.

A first view of a third combination 400 of an aerosol can 402 and nozzle assembly 100 is shown in FIG. 4A. This perspective view depicts engagement between valve connection 108 and a valve assembly of the aerosol can 404. This perspective view also depicts engagement between a rotating cam actuation lock and release lever 138 and a cup of the aerosol can 406.

Figure 4B:
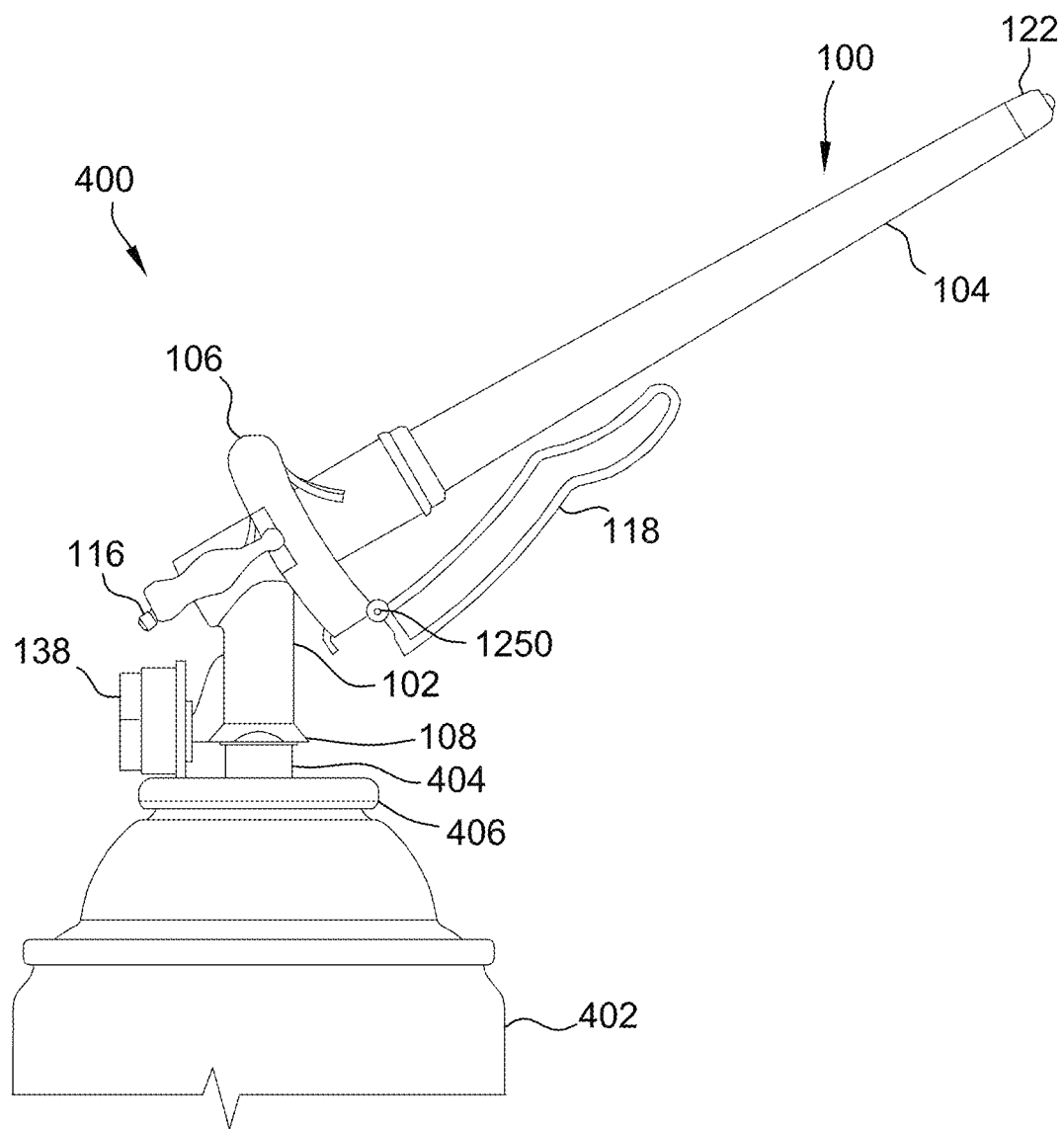
FIG. 4B is an exemplary embodiment of a side view of a nozzle assembly connected to an aerosol can in accordance with the present disclosure.

A second view of the third combination 400 of an aerosol can 402 and nozzle assembly 100 is shown in FIG. 4B. This side view depicts engagement between valve connection 108 and a valve assembly of the aerosol can 404. This side view also depicts engagement between the rotating cam actuation lock and release lever 138 and a cup of the aerosol can 406.

Figure 5A:
FIG. 5A is a photograph depicting an exemplary embodiment of an inventive foam composition applied with a commercial OCF gun-applicator applicator in accordance with the present disclosure.
Figure 5B:
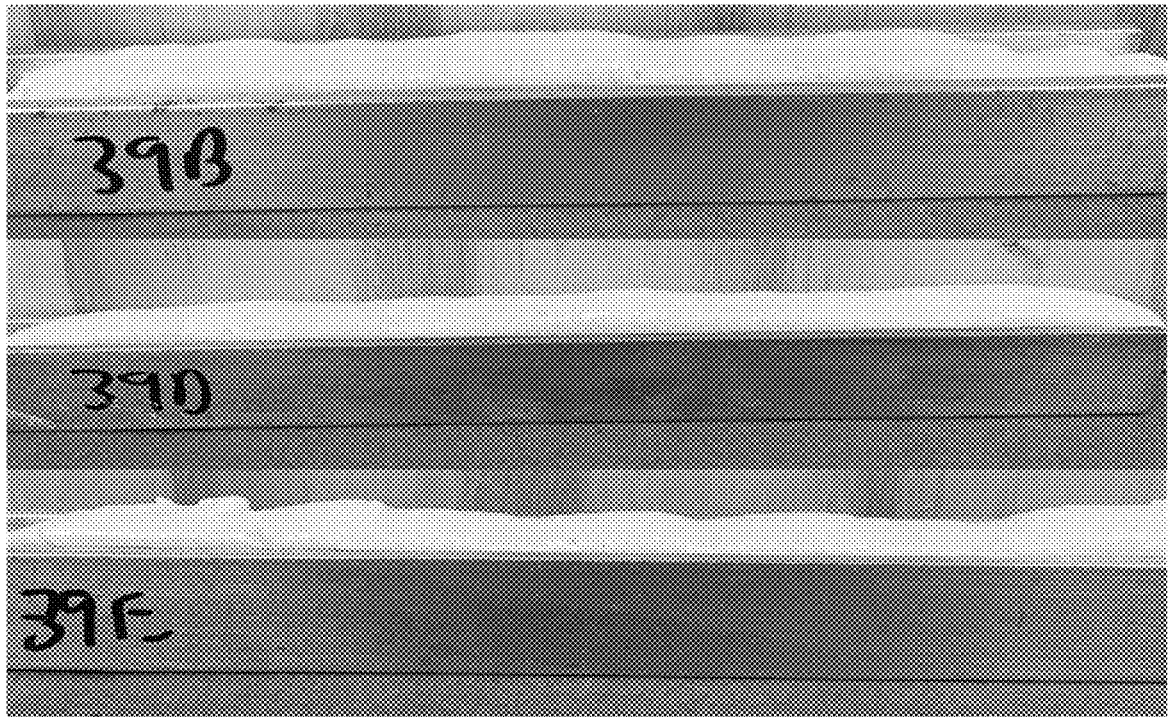
FIG. 5B is a photograph depicting an exemplary embodiment of an inventive foam composition applied with a commercial OCF gun-applicator applicator in accordance with the present disclosure.
Figure 5C:
FIG. 5C is a photograph depicting an exemplary embodiment of an inventive foam composition applied with a commercial smart dispenser in accordance with the present disclosure.
Figure 5D:
FIG. 5D is a photograph depicting an exemplary embodiment of an inventive foam composition applied with an inventive applicator in accordance with the present disclosure.

FIGS. 5A-5D are photographs showing inventive foam compositions applied with various foam applicators. FIG. 5A shows a foam of formula 126039 V2 applied with a commercial OCF gun-applicator applicator. FIG. 5B shows a foam of formula 126040 V4 applied with a commercial OCF gun-applicator applicator. FIG. 5C shows a foam of formula 126040 V4 applied with a commercial smart dispenser applicator. FIG. 5D shows a foam of formula 126039 V2 applied with an inventive applicator in accordance with the present disclosure. For each application, each fixture is filled with initially with the same height of foam. As can be seen, upon curing, the foams exhibit minimal expansion (less than 50%) when applied with a commercial OCF gun-applicator, a commercial smart dispenser applicator, or an inventive applicator in accordance with the present disclosure. Yet the foam expanded higher above the fixtures when using the commercial smart dispenser applicator compared to either the OCF gun-applicator or the inventive applicator. The straw-type applicator exhibits greater than 125% expansion for the same foam formula.

Figure 6:
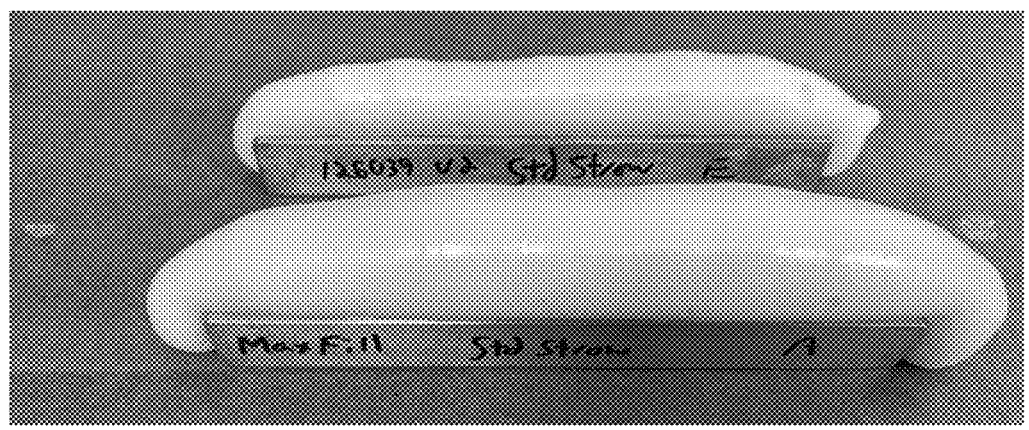
FIG. 6 is a photograph depicting a comparison between a conventional foam composition and an inventive foam composition each applied with a conventional straw-type applicator in accordance with the present disclosure.

FIG. 6 is a photograph showing a conventional OCF formula and an inventive foam of formula 126039 V2 that were each applied with a straw-type applicator. As can be seen, the inventive foam formula exhibits a whiter color and less expansion.

Exemplary embodiments of this disclosure include, but are not limited to the following:

Embodiment 1. A one-component polyurethane spray foam composition comprising:
  (a) an isocyanate-containing compound selected from the group consisting of 4,4'-diphenylmethane diisocyanate, polymeric 4,4'-diphenylmethane diisocyanate, prepolymers based on 4,4'-diphenylmethane diisocyanate, and combinations thereof;
  (b) optionally a polyol;
  (c) a propellant;
  (d) optionally a flame retardant;
  (e) optionally a plasticizer;
  (f) optionally a surfactant; and
  (g) optionally a catalyst.

Embodiment 2. The one-component polyurethane spray foam composition of embodiment 1, wherein the polyol is selected from the group consisting of polyol diols, polyol triols, and combinations thereof.

Embodiment 3. The one-component polyurethane spray foam composition of embodiment 1, wherein the isocyanate-containing compound is 4,4'-diphenylmethane diisocyanate.

Embodiment 4. The one-component polyurethane spray foam composition of embodiment 1, further comprising a polyol selected from the group consisting of polyether polyols, polyester polyols, aromatic polyols, aliphatic polyols, and combinations thereof.

Embodiment 5. A cured composition producible from the one-component polyurethane spray foam composition of embodiment 1, wherein the cured composition has a post-expansion rate of less than about 50%.

Embodiment 6. The one-component polyurethane spray foam composition of embodiment 1, further comprising a compound containing one or more isocyanate functional groups selected from the group consisting of polymeric isocyanates, aromatic isocyanates, aliphatic isocyanates, and combinations thereof.

Embodiment 7. The one-component polyurethane spray foam composition of embodiment 1, wherein the propellant comprises a non-flammable propellant selected from the group consisting of hydrofluoroolefins, hydrofluorocarbons, and combinations thereof.

Embodiment 8. The one-component polyurethane spray foam composition of embodiment 1, wherein the propellant comprises a flammable propellant selected from the group consisting of hydrocarbons, ethers, and combinations thereof.

Embodiment 9. The one-component polyurethane spray foam composition of embodiment 1, wherein the flame retardant is selected from the group consisting of halogenated organophosphates, organophosphates, chlorinated paraffins, and combinations thereof.

Embodiment 10. A dispenser comprising a pressurized container comprising a reservoir comprising the one-component polyurethane spray foam composition of embodiment 1.

Embodiment 11. A product comprising a cured composition producible from the one-component polyurethane spray foam composition of embodiment 1, wherein the product is selected from the group consisting of adhesives, sealants, insulating materials, building materials, and combinations thereof.

Embodiment 12. A method of making a one-component polyurethane spray foam composition comprising:
  (a) an isocyanate-containing compound selected from the group consisting of 4,4'-diphenylmethane diisocyanate, polymeric 4,4'-diphenylmethane diisocyanate, prepolymers based on 4,4'-diphenylmethane diisocyanate, and combinations thereof;
  (b) optionally a polyol;
  (c) a propellant;
  (d) optionally a flame retardant;
  (e) optionally a plasticizer;
  (f) optionally a surfactant; and
  (g) optionally a catalyst,
  the method comprising forming a mixture comprising (a)-(g).

Embodiment 13. A method of applying a one-component polyurethane spray foam composition comprising:
  (a) an isocyanate-containing compound selected from the group consisting of 4,4'-diphenylmethane diisocyanate, polymeric 4,4'-diphenylmethane diisocyanate, prepolymers based on 4,4'-diphenylmethane diisocyanate, and combinations thereof;
  (b) optionally a polyol;
  (c) a propellant;
  (d) optionally a flame retardant;
  (e) optionally a plasticizer;
  (f) optionally a surfactant; and
  (g) optionally a catalyst,
  the method comprising applying the one-component polyurethane spray foam composition to an application site.

Embodiment 14. The method of embodiment 13, wherein the applying the one-component polyurethane spray foam composition comprises dispensing the one-component polyurethane spray foam composition from a reservoir of a pressurized container.

Embodiment 15. The method of embodiment 13, wherein the application site comprises a surface, a cavity, a gap, a crack, and/or a hole.

Embodiment 16. A dispenser comprising:
a pressurized container comprising:
  a reservoir comprising a one-component spray foam composition; and
  a valve assembly; and
a mechanical applicator comprising:
  a body comprising:
    a valve connection fluidically connected to the valve assembly of the pressurized container;
    an internal foam path fluidically connected to the valve connection; and
    an actuator configured to actuate the valve assembly of the pressurized container between a storage configuration and an open configuration, wherein the valve assembly of the pressurized container is held in the open position when actuated to the open configuration; and
  an outlet nozzle fluidically connected to the internal foam path.

Embodiment 17. The dispenser of embodiment 16, wherein the mechanical applicator is configured to be mechanically coupled to the pressurized container.

Embodiment 18. The dispenser of embodiment 16, wherein the outlet nozzle comprises a tapered end portion.

Embodiment 19. The dispenser of embodiment 16, wherein the outlet nozzle comprises a control rod disposed therein.

Embodiment 20. The dispenser of embodiment 19, wherein the control rod extends into the internal foam path.

Embodiment 21. The dispenser of embodiment 20, wherein the internal foam path comprises an aperture, wherein the control rod extends through the aperture and seals the internal foam path.

Embodiment 22. The dispenser of embodiment 20, wherein the internal foam path comprises an internal spring, a washer, and an O-ring disposed therein.

Embodiment 23. The dispenser of embodiment 22, wherein the internal spring is configured to force the control rod against the tapered portion of the outlet nozzle, thereby providing an interference fit of the control rod and fine flow control of the one-component polyurethane spray foam composition.

Embodiment 24. The dispenser of embodiment 23, wherein the actuator is a mechanical actuator selected from the group consisting of a push pad, a button, a switch, a rotatable dial, a lift catch, a rotating cam, a lift-to-release mechanism, and combinations thereof.

Embodiment 25. The dispenser of embodiment 16, wherein the actuator comprises a mechanical coupler to couple the actuator to the pressurized container.

Embodiment 26. The dispenser of embodiment 16, wherein the actuator comprises a latch point to latch onto a surface of the pressurized container.

Embodiment 27. The dispenser of embodiment 26, wherein the latch point latches onto the surface of the pressurized container when in the open configuration.

Embodiment 28. The dispenser of embodiment 16, wherein the mechanical applicator further comprises a trigger actuator.

Embodiment 29. The dispenser of embodiment 28, wherein the trigger actuator is a foldable trigger actuator.

Embodiment 30. The dispenser of embodiment 16, wherein a cured composition producible from the one-component spray foam composition has a post-expansion rate of less than about 50%.

Embodiment 31. A method of using the dispenser of embodiment 16, the method comprising using the dispenser to apply the one-component spray foam composition to an application site.

EXAMPLES

Without further elaboration, it is believed that one skilled in the art using the preceding description can utilize the present invention to its fullest extent. The following Examples are, therefore, to be construed as merely illustrative, and not limiting of the disclosure in any way whatsoever.

Example 1. Comparison Between Known Compositions and Compositions in Accordance with the Present Disclosure Traditional one-component polyurethane foam formulations include polyols (polyester/or polyether polyol with functionality of 2-3), a DMDEE catalyst, a silicone surfactant (foam stabilizer), a flame retardant (typically TCPP), polymeric MDI, and a propellant/blowing agent. In aerosol can formulations (in sizes of 30.5 oz or less), flammable propellants are typically used (e.g. a blend of propane, isobutane and dimethyl ether). Propellants can be non-hydrocarbon flammable propellants, such as HFC-152a or its blend with hydrocarbon propellants. Alternatively, non-flammable propellants may be used (such as HFC-134a, HFO-12324ze, or their blend with other blowing agents (such as TDCE, HFO-1233zd, etc)). The post-expansion rates of these traditional formulations applied with a conventional straw-type applicator can be up to 2-3+ times (i.e. a post-expansion rate of 100-200+%).

These conventional one-component polyurethane foam formulations are compared to non-limiting examples of one-component polyurethane spray foam compositions shown in Table 1.

TABLE 1

Comparison between known compositions and inventive compositions in accordance with the present disclosure. The values are shown as weight percentages.

| Component | Conventional OCF Aerosol Compositions | Inventive Aerosol Foam Compositions |
| --- | --- | --- |
| Polyether, polyester, or combo diol | 5-18 | 5-20 |
| Polyether, polyester, or combo triol | 3-10 | 3-10 |
| Tri-chloroethyl-phosphate (TCPP) | 5-30 | 5-14 |
| Chlorinated Paraffin | 0-25 | 0-25 |
| Foam cell regulators (surfactant, etc) | 0.5-3 | 0.5-5 |
| DMDEE catalyst | 0.5-3 | 0.5-3 |
| Polymeric MDI | 30-55 | 0-55 |
| Pure-MDI prepolymer | N/A | 0-55 |
| Propane/isobutane, mixture | 5-20 | 4-14 |
| Dimethyl ether (DME) | 5-20 | 4-14 |

TABLE 1-continued

Comparison between known compositions and inventive
compositions in accordance with the present disclosure.
The values are shown as weight percentages.

| Component | Conventional OCF Aerosol Compositions | Inventive Aerosol Foam Compositions |
|---|---|---|
| Flammable Propellant | Yes | Yes |
| NCO:OH in formula | (3.5-5.5):1 | (3.7-4):1 |

Example 2. Inventive Compositions

Non-limiting examples of inventive one-component polyurethane spray foam compositions have been prepared. The components of these compositions are listed in Table 2 and Table 3.

The type of propellant contributes to the flammability and GWP status of the formulations. For example, HFO 1234ze, HFO 1233zd, HFO-1336mzz-Z, and HFO-1336mzz-E are the only commercially available non-flammable propellant or propellant blends that qualify as low GWP. The inventive one-component polyurethane spray foam compositions may include different propellants that contribute to flammability and GWP status.

TABLE 2

Embodiments of compositions in accordance with the present
disclosure. The values are shown as weight percentages.

| Component | Composition A | Composition B | Composition C |
|---|---|---|---|
| Polyether, polyester, or combo diol | 5-20 | 5-20 | 5-20 |
| Polyether, polyester, or combo triol | 3-10 | 3-10 | 3-10 |
| Tri-chloroethyl-phosphate (TCPP) | 5-14 | 5-14 | 5-14 |
| Chlorinated Paraffin | 0-25 | 0-25 | 0-25 |
| Foam cell regulators (surfactant, etc) | 0.5-5 | 0.5-5 | 0.5-5 |
| DMDEE catalyst | 0.5-3 | 0.5-3 | 0.5-3 |
| Polymeric MDI | 0-55 | N/A | N/A |
| Pure-MDI prepolymer | N/A | 0-55 | 0-55 |
| Propane/isobutane, mixture | 4-14 | 4-14 | N/A |
| Dimethyl ether (DME) | 4-14 | 4-14 | N/A |
| HFO-1234ze | N/A | N/A | 6-20 |
| HFO-1233zd | N/A | N/A | 0-10 |
| Flammable propellant | Yes | Yes | No |
| Foam with white Color | No | Yes | Yes |
| Minimal expansion when applied with inventive applicator | Yes | Yes | Yes |

TABLE 3

An embodiment of a composition in accordance with the present
disclosure. This composition achieves particularly excellent
physical properties and very minimal expansion when applied
with the applicator according to the present disclosure.
The values are shown as weight percentages.

| Component | Composition D |
|---|---|
| Prepolymer containing blend of polyether diol/triol | 56.6 |
| TCPP or mixture of TCPP and chlorinated paraffin | 26.8 |
| Foam cell regulators (silicone surfactant and other additive) | 2.6 |
| DMDEE catalyst | 1.0 |
| Propane/isobutane, mixture | 6.5 |
| Dimethyl ether (DME) | 6.5 |
| Flammable propellant | Yes |
| Foam with white Color | Yes |
| Minimal expansion with inventive applicator | Yes |

Example 3. Aerosol Foams Produced by Applying a Composition in Accordance with the Present Disclosure with a Known Applicator Known and inventive one-component polyurethane spray foam compositions were applied as aerosol foam using a "smart dispenser" (a commercial applicator from Dupont, the Smart Dispenser™, sold under the brand name Great-Stuff®). The results are shown in Table 4.

As used in these Examples, UB Material is a polyol pre-blend including a polyol, a flame retardant, a plasticizer, a surfactant, and/or a catalyst.

TABLE 4

Aerosol foams produced by applying a composition in accordance
with the present disclosure with a known applicator.

| | TARGET | 126040 V4 | 126039 V2 |
|---|---|---|---|
| Isocyanate | Pure MDI to impart whiteness | Isonate-181* | Isonate-181* |
| UB Material | Inventive | UB126013 V3 | UB9827 |
| Propellant | Hydrocarbon blend | A60/DME 50/50** | A60/DME 50/50** |
| Properties of Cured Foam | | | |
| Foam Color | White | White | White |
| NCO (%) | 10-13 | 12.5 | 10.5 |
| Expansion (%) (per ASTM C 1643) | <50% | 13 | 15 |
| Closed Cell % (per ASTM D 6226) | <50% | 21.10 | 11.95 |
| Cure Force (psi) (per AAMA 812) | <1 | 0.08 | 0.03 |
| Friability when applied at 25° F.? | Not friable | Not friable | Not friable |
| Friability when applied at 20° F.? | Not friable | Friable | Not friable |
| Tensile Strength (psi) (per ASTM D 1623) Wood to Wood | >5 | 9.87 | 8.58 |

TABLE 4-continued

Aerosol foams produced by applying a composition in accordance with the present disclosure with a known applicator.

|  | TARGET | 126040 V4 | 126039 V2 |
|---|---|---|---|
| Water Absorption after 4 days (% vol) | <2% | 0.73 | 1.73 |
| Visible Shrinkage | None | None | None |

*Isonate-181 is an MDI based prepolymer manufactured by Dow Chemical.
**A60/DME is a blend of hydrocarbon propellant and DME.

Example 4. Expansion Comparisons for Aerosol Foams Produced by Applying Compositions in Accordance with the Present Disclosure with Various Applicators Inventive one-component polyurethane spray foam compositions were applied as aerosol foam using various applicators. The applicators include "straw-type applicator" (a standard angler-adaptor with straw), "OCF gun-applicator" (a standard OCF gun-applicator) and "smart dispenser" (a commercial applicator from Dupont, the Smart Dispenser", sold under the brand name GreatStuff). FIGS. 5A-5D show the applied foams and Tables 5-6 show the relative expansions of the foams.

TABLE 5

Expansion comparison between aerosol foams produced by applying a composition in accordance with the present disclosure with various applicators.

| Formula | 126039 V2 | 126039 V2 | 126039 V2 | 126039 V2 |
|---|---|---|---|---|
| Applicator | Straw-type Applicator | OCF gun-applicator | Smart dispenser | Inventive Applicator |
| Expansion (%) | <140 | <30 | <20 | <20 |
| NCO (%) | 10.5 | 10.5 | 10.5 | 10.5 |

TABLE 6

Expansion comparison between aerosol foams produced by applying a composition in accordance with the present disclosure with various applicators.

| Formula | 126040 V4 | 126040 V4 | 126040 V4 | 126040 V4 |
|---|---|---|---|---|
| Applicator | Straw-type Applicator | OCF gun-applicator | Smart dispenser | Inventive applicator |
| Expansion (%) | <180 | <30 | <20 | <20 |
| NCO (%) | 12.5 | 12.5 | 12.5 | 12.5 |
| Foam Shrinkage | visible | none | none | none |

Example 5. Expansion Comparisons for Aerosol Foams Produced by Applying Various Foam Compositions with a Straw-Type Applicator Conventional and inventive one-component polyurethane spray foam compositions were applied as aerosol foam using a "straw-type applicator" (a standard angler-adaptor with straw). FIG. 6 shows the applied foams and Table 7 shows the relative expansions of the foams.

TABLE 7

Expansion comparison between aerosol foams produced by applying various foam compositions with a straw-type applicator.

| Formula | Conventional OCF Aerosol Composition | 126039 V2 | 126040 V4 |
|---|---|---|---|
| NCO (%) | 14 | 10.5 | 12.5 |
| Applicator | Straw-type Applicator | Straw-type Applicator | Straw-type Applicator |
| Expansion (%) | >300 | <140 | <180 |

The present disclosure demonstrates one-component polyurethane foam compositions with multiple beneficial properties. One-component polyurethane foam compositions in accordance with the present disclosure have low post-expansion rates. They may be applied with fine flow control and are capable of achieving premium performance characteristics. The combination of low post-expansion rates and precise application provides minimal disparities between dispensed compositions and fully cured compositions. The compositions of the present disclosure are useful in a wide variety of applications, and particularly useful in construction applications.

This written description uses examples to illustrate the present disclosure, including the best mode, and also to enable any person skilled in the art to practice the disclosure, including making and using any compositions or systems and performing any incorporated methods. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Where an invention or a portion thereof is defined with an open-ended term such as "comprising," it should be readily understood that (unless otherwise stated) the description should be interpreted to also describe such an invention using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

As used herein, the term "about" means plus or minus 10% of the value.

What is claimed is:

1. A one-component polyurethane spray foam composition comprising:
    (a) an isocyanate-containing compound selected from the group consisting of 4,4'-diphenylmethane diisocyanate, polymeric 4,4'-diphenylmethane diisocyanate, prepolymers based on 4,4'-diphenylmethane diisocyanate, and combinations thereof, wherein the isocyanate-containing compound comprises an isocyanate (NCO) content;
    (b) a polyol comprising a hydroxyl (OH) content;
    (c) a propellant;
    (d) optionally a flame retardant;
    (e) optionally a plasticizer;
    (f) optionally a surfactant; and
    (g) optionally a catalyst;
    wherein a ratio of NCO:OH is in a range of from about 3.5 to about 5.5;
    wherein a cured composition is producible from the one-component polyurethane spray foam composition.

2. The one-component polyurethane spray foam composition of claim 1, wherein the polyol is selected from the group consisting of polyol diols, polyol triols, and combinations thereof.

3. The one-component polyurethane spray foam composition of claim 1, wherein the isocyanate-containing compound is 4,4'-diphenylmethane diisocyanate.

4. A cured composition producible from the one-component polyurethane spray foam composition of claim 1, wherein the cured composition has a post-expansion rate of less than about 50%.

5. The one-component polyurethane spray foam composition of claim 1, wherein the propellant comprises a nonflammable propellant selected from the group consisting of hydrofluoroolefins, hydrofluorocarbons, and combinations thereof.

6. The one-component polyurethane spray foam composition of claim 1, wherein the propellant comprises a flammable propellant selected from the group consisting of hydrocarbons, ethers, and combinations thereof.

7. A product comprising a cured composition producible from the one-component polyurethane spray foam composition of claim 1, wherein the product is selected from the group consisting of adhesives, sealants, insulating materials, building materials, and combinations thereof.

8. A dispenser comprising:
    a pressurized container comprising:
        a reservoir comprising the one-component spray foam composition of claim 1
    a valve assembly; and
    a mechanical applicator comprising:
        a body comprising:
            a valve connection fluidically connected to the valve assembly of the pressurized container;
            an internal foam path fluidically connected to the valve connection; and
            an actuator configured to actuate the valve assembly of the pressurized container between a storage configuration and an open configuration, wherein the valve assembly of the pressurized container is held in the open position when actuated to the open configuration; and
        an outlet nozzle fluidically connected to the internal foam path.

9. The dispenser of claim 8, wherein the mechanical applicator is configured to be mechanically coupled to the pressurized container.

10. The dispenser of claim 8, wherein the outlet nozzle comprises a tapered end portion.

11. The dispenser of claim 8, wherein the outlet nozzle comprises a control rod disposed therein.

12. The dispenser of claim 11, wherein the control rod extends into the internal foam path.

13. The dispenser of claim 12, wherein the internal foam path comprises an aperture, wherein the control rod extends through the aperture and seals the internal foam path.

14. The dispenser of claim 12, wherein the internal foam path comprises an internal spring, a washer, and an O-ring disposed therein.

15. The dispenser of claim 14, wherein the internal spring is configured to force the control rod against the tapered portion of the outlet nozzle, thereby providing an interference fit of the control rod and fine flow control of the one-component polyurethane spray foam composition.

16. The dispenser of claim 8, wherein the actuator is a mechanical actuator selected from the group consisting of a push pad, a button, a switch, a rotatable dial, a lift catch, a rotating cam, a lift-to-release mechanism, and combinations thereof.

17. The dispenser of claim 8, wherein the mechanical applicator further comprises a trigger actuator.

18. The dispenser of claim 17, wherein the trigger actuator is a foldable trigger actuator.

19. The dispenser of claim 8, wherein a cured composition producible from the one-component spray foam composition has a post-expansion rate of less than about 50%.

20. A method of using the dispenser of claim 8, the method comprising using the dispenser to apply the one-component spray foam composition to an application site.

* * * * *